United States Patent [19]

Short et al.

[11] Patent Number: 4,873,110

[45] Date of Patent: Oct. 10, 1989

[54] METHOD FOR PRODUCING BREAKFAST CEREAL

[75] Inventors: Allen T. Short, Barrington; Raleigh J. Wilkinson, Lockport, both of Ill.

[73] Assignee: J. R. Short Milling Company, Chicago, Ill.

[21] Appl. No.: 196,589

[22] Filed: May 20, 1988

Related U.S. Application Data

[63] Continuation-in-part of Ser. No. 177,831, Mar. 22, 1988, which is a continuation of Ser. No. 37,054, Apr. 13, 1987, abandoned, which is a continuation of Ser. No. 836,704, Mar. 6, 1986, abandoned.

[30] Foreign Application Priority Data

Mar. 30, 1987 [CA] Canada ................................. 533273

[51] Int. Cl.$^4$ ............................................. A23L 1/164
[52] U.S. Cl. ................................... 426/621; 426/457; 426/560
[58] Field of Search ................ 426/621, 549, 96, 446, 426/449, 457, 511, 560

[56] References Cited

U.S. PATENT DOCUMENTS

| | | | |
|---|---|---|---|
| 1,364,634 | 1/1921 | Lippen | 426/621 |
| 2,388,904 | 11/1945 | Collatz | 426/457 |
| 2,552,290 | 5/1951 | Lilly et al. | 426/446 |
| 2,788,277 | 4/1957 | Huber | 426/621 |
| 2,882,162 | 4/1959 | Holahan | 426/457 |
| 3,062,657 | 11/1962 | Vollink | 426/446 |
| 3,121,637 | 2/1964 | Clausi et al. | 426/457 |
| 3,318,705 | 5/1967 | Clausi et al. | 426/621 |
| 3,345,183 | 10/1967 | Lilly et al. | 426/457 |
| 3,453,115 | 7/1969 | Clausi et al. | 426/446 |
| 3,484,250 | 12/1969 | Vollink et al. | 426/621 |
| 3,556,802 | 1/1971 | Gulstad | 426/621 |
| 3,682,647 | 8/1972 | Bedenk et al. | 426/621 |
| 3,689,279 | 9/1972 | Bedenk | 426/620 |
| 3,708,308 | 1/1973 | Bedenk et al. | 426/449 |
| 3,814,824 | 6/1974 | Bedenk | 426/621 |
| 3,845,232 | 10/1974 | Reesman | 426/457 |
| 3,976,793 | 8/1976 | Olson et al. | 426/96 |
| 4,044,159 | 8/1977 | Lutz | 426/302 |
| 4,431,674 | 2/1984 | Fulger et al. | 426/18 |
| 4,435,430 | 3/1984 | Fulger et al. | 426/18 |
| 4,472,449 | 9/1984 | Quinn et al. | 426/621 |
| 4,497,840 | 2/1985 | Gould et al. | 426/560 |
| 4,710,386 | 12/1987 | Fulger et al. | 426/28 |

OTHER PUBLICATIONS

CRC Handbook of Food Additives, vol. I, published by the CRC Press, Inc. Cleveland, Ohio, 1972 (p. 624).

*Primary Examiner*—George Yeung
*Attorney, Agent, or Firm*—Roylance, Abrams, Berdo & Goodman

[57] ABSTRACT

A method for producing a breakfast cereal from half products comprising the steps of: extruding pellet half products of a gelatinized, starch-containing material; drying the pellet half products to a moisture content of from about 9.5 to about 17.0 percent by weight under conditions which inhibit case hardening to form dried half products suitable for extended storage; rehydrating the dried half products to a moisture content of from about 18.0 to about 23.0 percent to form rehydrated half products; optionally treating the rehydrated half products with a moisture-absorbing compound to reduce the stickiness of the outer surface of the rehydrated half products; flaking the rehydrated half products into flakes; optionally circulating air about the flakes to reduce the moisture content of the flakes to from about 15.0 to about 18.0 percent; and toasting the flakes to a final moisture content of from about 2.0 to about 5.0 percent.

10 Claims, 2 Drawing Sheets

METHOD FOR PRODUCING BREAKFAST CEREAL

RELATED U.S. APPLICATION DATA

This application is a continuation-in-part of U.S. Application Ser. No. 177,831, filed Mar. 22, 1988, which is a continuation of U.S. Application Ser. No. 037,054, filed Apr. 13, 1987, abandoned, which is a continuation of U.S. Application Ser. No. 836,704, filed Mar. 6, 1986 abandoned.

FIELD OF THE INVENTION

The present invention relates to food compositions and methods of preparation. More particularly, the present invention relates to breakfast flakes made from starch-containing, rehydrated half products.

BACKGROUND OF THE INVENTION

One of the most common breakfast items available today are flakes made of corn, wheat or other gelatinized, starch-containing material. Numerous processes are known for making breakfast flakes from pellets of such materials. There are, however, disadvantages to those processes. For example, those prior art processes require the pellets to be flaked shortly after they are produced or dried. The prior art pellets are not meant to be stored for extended periods of time before flaking, and thus the prior art does not teach how to produce flakes from pellets which have been stored for extended periods, especially when the pellets have a low moisture content.

Examples of these prior art processes are disclosed in U.S. Pat. Nos. 1,364,634 to Lippen; 2,388,904 to Collatz; 2,552,290 to Lilly et al; 2,788,277 to Huber; 2,882,162 to Holahan; 3,062,657 to Vollink; 3,121,637 to Clausi et al; 3,318,705 to Clausi et al; 3,345,183 to Lilly et al; 3,453,115 to Clausi et al; 3,484,250 to Vollink et al; 3,556,802 to Gulstad; 3,814,824 to Bedenk et al; 3,845,232 to Reesman; 3,976,793 to Olson et al; 4,044,159 to Lutz; 4,431,674 to Fulger et al; 4,435,430 to Fulger et al; and 4,472,449 to Quinn et al.

SUMMARY OF THE INVENTION

Accordingly, a primary object of the invention is to provide a process from which breakfast flakes can be produced from half products.

Another object of the invention is to provide a process which allows half products having relatively low moisture contents to be stored for an extended period of time before flaking.

The foregoing objects are basically attained by the method for producing a breakfast cereal from half products comprising the steps of extruding pellet half products of a gelatinized, starch-containing material, drying the pellet half products to a moisture content of from about 9.5 to about 17.0 percent by weight under conditions which inhibit case hardening to form dried half products suitable for extended storage; rehydrating the half products to a moisture content of from about 18.0 to about 23.0 percent by weight to form rehydrated half products; flaking the rehydrated half products into flakes; and toasting the flakes to a final moisture content of from about 2.0 to about 5.0 percent by weight.

Other objects, advantages and salient features of the invention will become apparent from the following detailed description, which, taken in conjunction with the annexed drawings, discloses a preferred method of the invention.

DETAILED DESCRIPTION OF THE INVENTION

The method of this invention is dependant upon the use of a starch-containing material which, upon gelatinization under conditions of relatively low shear mixing and temperatures not exceeding about 160° C. (320° F.), advantageously not exceeding 155° C. (311° F.), will form a relatively uniform matrix. Exemplary of such starch-containing material are corn flour, waxy maize corn flour, rice flour, wheat flour and potato (generally in the form of granules or flakes). If corn flour is used, it is preferred that the flour be derived mainly from the horny endosperm of the corn kernel. "Reduction flour" is a type of flour obtained in dry milling and is derived mainly from the horny endosperm of the corn kernel. The use of corn materials derived predominantly from the horny endosperm of the corn kernel is described fully in our co-pending U.S. application Ser. No. 037,054, filed Apr. 13, 1987, which is a continuation of our U.S. application Ser. No. 836,704 filed Mar. 6, 1986.

A variety of optional materials can also be added to the mixture which forms the half products of this invention. Such materials can render the half products and breakfast cereal more nutritious and/or aesthetically or organoleptically desirable. Such ingredients include additional starch materials, sucrose, various protein sources, shortening and common salt. A description of such optional materials is found in Van Hulle 4,409,250. Such optional ingredients can generally comprise up to a few percent by weight of the half product.

Likewise, other ingredients such as colors, dyes, flavors, flavored coatings, vitamins, preservatives, etc. may be added as minor components. Of course, many possibilities for additives, and particularly flavoring additives and coatings, will be readily apparent to those skilled in the art.

One method for making half products is described below, although other methods or variations will be readily apparent to one skilled in the art.

Figure 1:
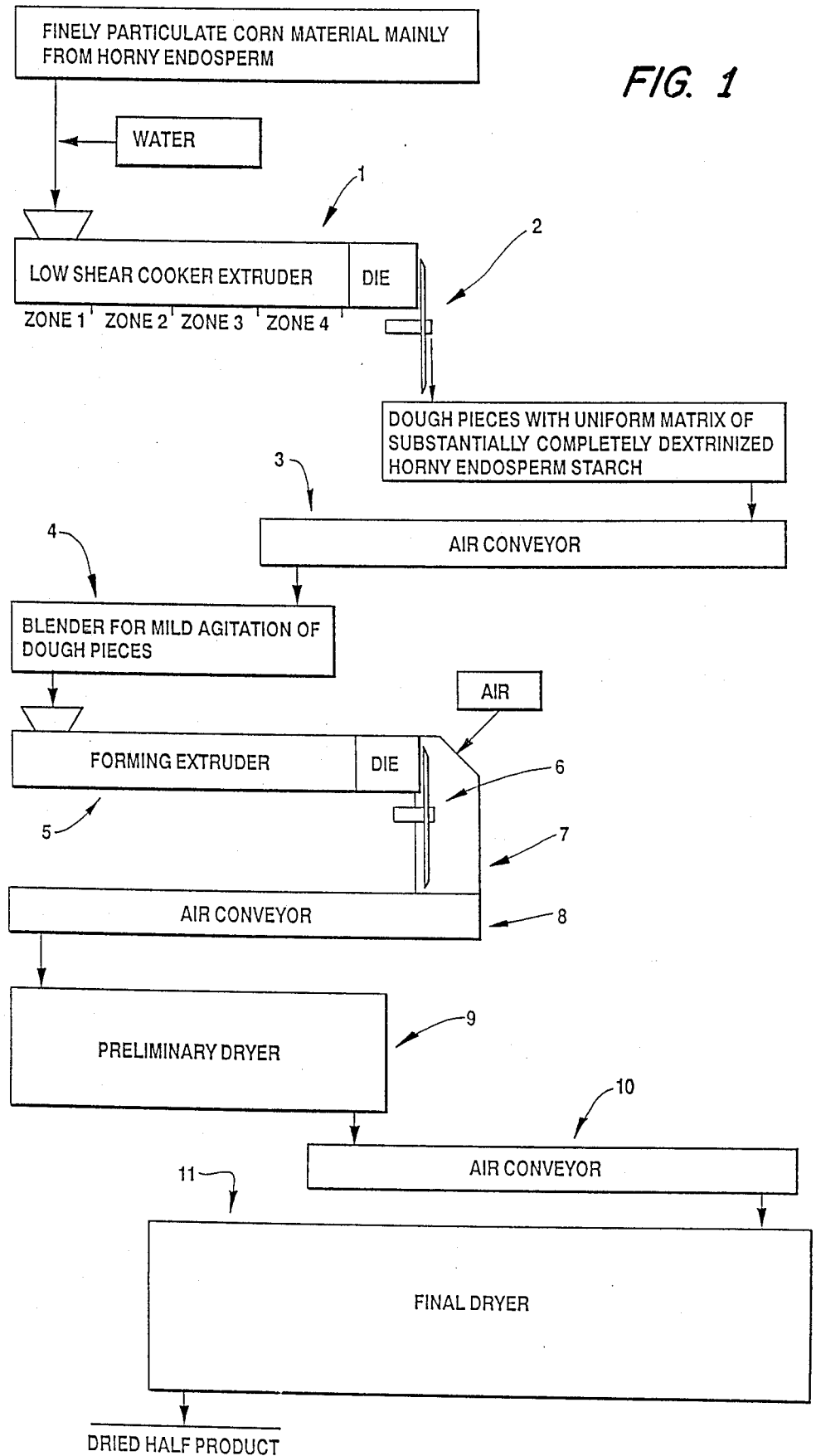
FIG. 1 is a flow diagram of one embodiment of a method for making a half product in accordance with the present invention.
Figure 2:
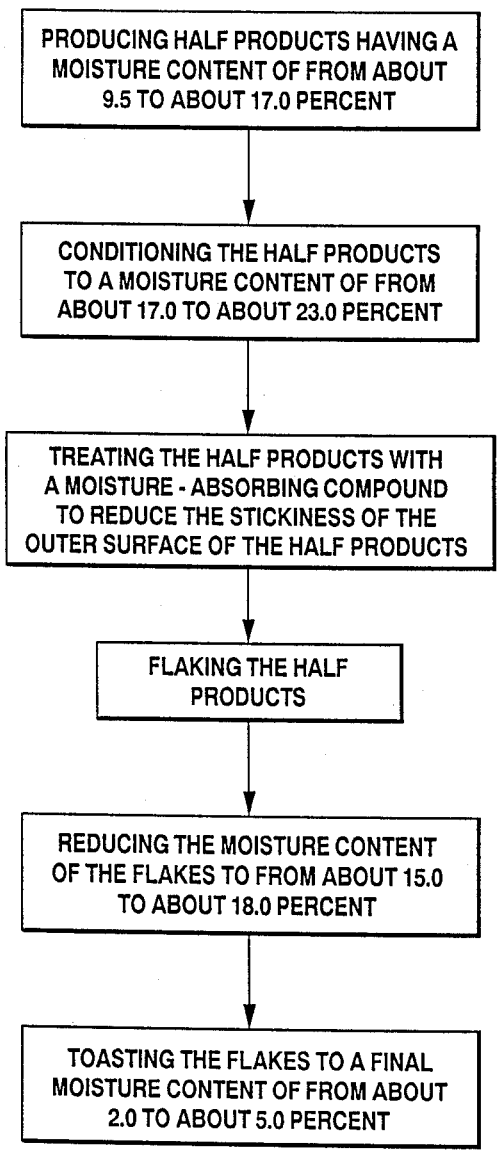
FIG. 2 is a flow diagram of a method for making breakfast cereal flakes in accordance with the present invention.

Starch-containing material, such as dry milled reduction flour from yellow corn, is combined with sufficient water to bring the moisture content within the range of 30–40 percent by weight, and the mixture is delivered to a conventional single screw cooker extruder 1, FIG. 1, for processing to gelatinize the starch content of the corn material. The cooker extruder is operated to mix the material, under low shear conditions, into a uniform dough and subjects the mix to temperatures which increase from the input end of the extruder barrel toward the die, commencing at at least 55° C. (131° F.) adjacent the input and increasing, stepwise or progressively, to no more than 160° C. (320° F.) at the output end of the barrel, the precise temperatures depending upon the size and throughput rate of the cooker extruder. For best results, the barrel of cooker extruder 1 is divided into four equal zones each equipped with electrical resistance heaters. The following table gives operative temperature ranges for the four zones for a semiworks or pilot plant apparatus and for a full scale production plant.

| | TEMPERATURE RANGES | |
|---|---|---|
| ZONE | Semiworks (2 inch) Screw Diameter | Full Scale (8 inch) Screw Diameter |
| 1 | 55–75° C. (131–167° F.) | 120–130° C. (248–266° F.) |
| 2 | 75–85° C. (167–185° F.) | 130–140° C. (266–284° F.) |
| 3 | 100–115° C. (212–239° F.) | 140–155° C. (284–311° F.) |
| 4 | 115–125° C. (239–259° F.) | 150–150° C. (302–320° F.) |

Optimum temperatures for the four zones are 70° C. (158° F.), 85° C. (185° F.), 110° C. (230° F.) and 120° C. (248° F.) for the semiworks scale apparatus and 125° C. (257° F.), 135° C. (275° F.). 145° C. (293° F.) and 155° C. (311° F.) for a full scale apparatus with cooker extruder 1 having a screw diameter of 8 inches. Residence time of the mix in the barrel of cooker extruder 1 is in the range of 1–1.5 min. and the head pressure is sufficiently low to cause the dough to ooze from the die in the form of a relatively shapeless glob. Such operation of cooker extruder 1 achieves a uniform and substantially complete gelatinization of the starch and not only distributes the added water uniformly through the dough during the mixing operation but also causes at least a substantial part of the moisture to be entrapped in the tiny capillary-like cells of the starch matrix by the time the mix, now in the form of a uniform dough, is forced through the die orifice or orifices.

The dough emerging from the die of cooker extruder 1 is cut by rotary knife 2 into relatively small glob-like pieces 0.5–4 inches (1.3–10 cm) long, each piece consisting of a uniform dough matrix in which the starch is up to 98 percent gelatinized, as measured by the Maltese Cross test, with the matrix having substantially the same total moisture content as did the corn material after the water was added. Despite the relatively high moisture content, the dough pieces are individually coherent and can be handled and conveyed. After being cut off by knife 2, the dough pieces are delivered by air conveyor 3 to blender 4, typically a radial blade rotary blender, which subjects the dough pieces to a relatively gentle agitation in the presence of ambient air so as to reduce the moisture content at and near the surfaces of the pieces. The pieces are then delivered directly into the input end of a kneading and forming extruder 5. The dough pieces are treated in blender 4 for a period of time such that the total moisture content of the pieces is reduced by 3–10 percent, bringing the moisture content down to the range of 25–37 percent by weight.

Extruder 5 is so designed as to have a first stage, which serves primarily to knead the dough pieces into one continuous mass, and a second stage, which is adjacent the die and serves to compact the dough mass just before it enters the die. The extruder is of the type in which both the screw and the barrel are water cooled, with the cooling water exit temperature being measured, and the operator observes the extruded material and adjusts the cooling water temperature to make the dough firmer or more pliable, as required to achieve adequate shaping and proper cutting of the extruded material. The die structure of extruder 5 includes a preliminary portion to divide the dough mass into a plurality of individual strands, and a die orifice for each strand, the orifices converting the strands into the desired cross-sectional shape. Preferably, the die orifices are round to produce substantially spherically shaped pellet half products. Head pressure for extruder 5 is 1160–1855 p.s.i., advantageously 1400–1680 p.s.i. Upon emerging from the die orifices, the strands are cut into individual pieces by rotary knife 6. As they are cut off at the die orifices, the individual formed pieces are directed by an air stream through a confining shroud 7 into air conveyor 8 and delivered by that conveyor to the input hopper of a predryer 9.

Dryer 9 is of the endless belt type in full scale production apparatus and, for practical purposes, a static dryer is used in semiworks scale operations. When of the continuous belt type, the belts are of screen material and the drying atmosphere is directed upwardly through the layer of formed pellet half product pieces supported by the belt. The drying atmosphere can be ambient air at 70°–80° C. (158°–176° F.). Residence time in the dryer is selected to effect removal of the surface moisture from the formed pieces before discharge from the dryer so that the formed pieces are then substantially non-sticky. The surface moisture of the formed pieces does not exceed 5 percent by weight and is usually less, so that the pieces as discharged from predryer 9 have a total moisture content of not less than 20 percent by weight, advantageously 20–24 percent, with substantially all of the moisture being uniformly distributed internally of the formed piece.

After discharge from dryer 9, the formed pieces are delivered by air conveyor 10 to a final dryer 11 by which the formed pieces are slowly dried, without case hardening, until the moisture content is in the range of about 9.5–17 percent, advantageously about 13–14 percent, by weight. For full scale production, dryer 11 advantageously includes several stages through which the formed pieces are carried by formainous endless conveyor belts, a drying atmosphere of controlled temperature and humidity being passed upwardly through the conveyor belts and the layers of formed pieces carried thereby. Excellent results are achieved when the dryer includes five successive stages, with the drying atmosphere being air at 47°–50° C. (116°–122° F.) and a relative humidity of 81 percent in the first stage; 51°–54° C. (123°–129° F.) and a relative humidity of 92 percent in the second stage; 50°–54° C. (122°–129° F.) and a relative humidity of 89 percent in the third stage, 47°–51° C. (116°–123° F.) and a relative humidity of 84 percent in the fourth stage, and 42°–47° C. (107°–121° F.) and a relative humidity of 34 percent in the fifth stage. Residence times in the five stages can be equal, with a total residence time in the dryer of 5.5–7.5 hours. The above temperatures and residence times will yield dried half products having about a 13–14 percent moisture content. Temperatures and residence times can be increased for lower moisture contents or decreased for higher moisture contents.

When a potato starch-containing material is used, it is advantageous to use a single stage or transfer screw in the single screw cooker extruder 1. The use of either such screw will transfer the material through the gelatinizer more quickly and at a lower shear, thereby preventing over-cooking of the potato starch.

One method for making breakfast cereal flakes from half products is described below, although other methods or variations will be readily apparent to one skilled in the art.

The first step comprises rehydrating the half products, which can be carried out, for example, in a rotary steamer-cooker. The half products should be rehydrated to a moisture content of from about 18.0 to about 23.0 percent, and preferably from about 18.0 to about 22.0 percent. The steamer-cooker should be preheated with steam using no pressure. This will prevent steam from condensing into water when it is injected into the steamer-cooker after the half products are placed into it. The half products should be mechanically manipulated to prevent their sticking together. This can be accomplished by rotating the half products at approximately four or more revolutions per minute in the rotary steamer-cooker. The rotation of the half products may be increased as necessary. Other types of mechanical manipulation can also be used to prevent the half products from sticking together. When using a wet steam, half products having an initial moisture content of about 13.0–14.0 percent should be conditioned for approximately 35 minutes. The conditioning times may be lengthened or shortened depending on the initial moisture content of the half products. Superheated steam can also be used.

It is important when rehydrating the half products to keep the surface moisture to a minimum to prevent the half products from becoming too sticky. This can be accomplished by increasing the temperature of the half products, thereby increasing penetration of the water from the steam into the half products.

After rehydrating to the proper moisture content, the half products are emptied from the steamer-cooker and separated using, for example, a pin-type separator which is rotated at a relatively high rate. This separates the half products and prevents them from sticking together. Other types of separators which achieve the desired result can also be used.

Optionally, the half products can be treated with a moisture-absorbing compound to reduce the stickiness of the outer surface of the half products. The moisture-absorbing compound can be sprinkled or dusted onto the half products. Tricalcium phosphate works well as a moisture-absorbing compound, however, other compounds such as starch-containing compounds (e.g., corn flour) which absorb water can be used.

The half products are then transported to flaking rolls for flaking. The process of flaking using flaking rolls is well known and will be understood by those skilled in the art.

Optionally and preferably, the moisture content of the flakes can be reduced after flaking to from about 15.0 to about 18.0 percent. This can be done, for example, by circulating air about the flakes while they are being conveyed.

The flakes are then toasted to a final moisture content of from about 2.0 to about 5.0 percent. If the moisture content of the flakes were previously reduced to 15.0 to about 18.0 percent, then the temperature of the oven for toasting should be set in the range of from about 390° to about 500° F. and the flakes cooked for about 30–60 seconds. However, if the moisture content of the flakes were not reduced, then the temperature of the oven should be set slightly higher and/or the time period for cooking should be slightly longer.

The half products, breakfast cereal flakes, and methods of this invention are illustrated by the following examples.

EXAMPLE 1

A half product of this invention can be made as follows: Cooker extruder 1 can be a conventional single screw cooker extruder manufactured by Mapimpianti S.P.A. and having a 2 inch screw diameter, the barrel being equipped with four electrical resistance heaters for controlled heating of the four successive zones of the extruder, the extruder screw being conventionally designed for low shear operation, and the extruder being operated at such low head pressures that the head pressure was not measured. Such apparatus is of pilot plant or semiworks scale and is used in experimental runs for the sake of economy.

A dry milled reduction flour from yellow corn can be used as the source of gelatinizable starch. The flour can have an initial moisture content of 10.5 percent by weight and a fat content of 1.5 percent by weight. The particle size distribution of the flour can be such that only 4.3 percent by weight remained on a 60 mesh U.S. Standard Series screen and 35.6 percent by weight passed a 100 mesh screen. The mixture supplied to cooker extruder 1 can consist of 74.7 percent by weight corn reduction flour and 25.3 percent by weight added water. Cooker extruder 1 can be operated at 70° C. (158° F.) in the first zone, 85° C. (195° F.) in the second zone, 110° C. (230° F.) in the third zone and 120° C. (248° F.) in the fourth zone. The screw can be operated at 37 r.p.m. The die orifice can be of circular transverse cross section and the dough emerging from the orifice should look more like an oozing glob than a shaped strand. Knife 2 should rotate at a speed such that all of the dough pieces obtained will be in the size range of 0.5–4 inches (1.2–10 cm) in length. The dough pieces can be air-conveyed to blender 4 and there agitated for 5 minutes, then delivered into the input end of forming extruder 5. Moisture content of the dough pieces as delivered to the forming extruder should be approximately 25 percent by weight.

The extrusion orifices of the die of forming extruder 5 is preferably shaped to provide each extruded strand with a diameter of 1.2 inches (3.1 cm) and substantially round transverse cross section. Extruder 5 should be operated with a screw temperature of 27° C. (80.6° F.), a barrel temperature of 40° C. (104° F.) and a head pressure within the range of 1400–1680 p.s.i. Knife 6 should be rotated at a speed such that the formed pieces cut off by the knife have a thickness of approximately 0.05 inch (1.25 mm). The pellet half products thus obtained can now be air-conveyed to preliminary dryer 8, such as a static dryer in which the pieces can be shelf-supported rather than being conveyed and subjected to flowing air as the drying atmosphere at 78° C. (172° F.) for 1.5 minutes to remove surface moisture and render the shaped pieces non-sticky. The shaped pieces can be then air-conveyed to final dryer 10, such as a static dryer. The flowing drying atmosphere in dryer 10 should have an air temperature of about 60° C. (140° F.) and a relative humidity of about 85 percent, the residence time of the product in the dryer being 6 hours.

The dried half products produced should have a substantially uniform size, shape and color, and all having a very hard, slightly shiny external surface of uniform yellowish color which could be described by some observers as golden and others as a yellowish tan.

EXAMPLE 2

Breakfast cereal flakes were made in accordance with this invention as follows. Dried half products made substantially as described above were placed into a rotary steamer-cooker and rotated at approximately four revolutions per minute. The steamer-cooker, Model Nos. 70118 and 70119 (1979), was manufactured by Lox Equipment of Adelphi, Indiana, (previously the Alloy Crafts Company). Only half the steam that is normally employed in this type of steamer-cooker was used. Furthermore, the steamer-cooker was not pressurized. The dried half products were steamed and rotated in the steamer-cooker for approximately 35 minutes, and thus rehydrated to a moisture content of from about 18.0 to about 23.0 percent.

The rehydrated half products were then emptied onto a pin-type separator rotating at a relatively high rate. The rehydrated half products were dusted with tricalcium phosphate to absorb moisture, thereby reducing the stickiness of their outside surface.

The rehydrated half products were then transported by a pneumatic system to a cyclone holding area for flaking. Once a sufficient quantity of half products was transported, they were dropped into the flaking rolls. The half products were flaked and then the flakes were conveyed from beneath the flaking rolls to a Proctor-Schwartz oven.

The Proctor-Schwartz oven was not heated, but merely provided recirculated air to reduce the moisture of the flakes to from about 15.0 percent to about 18.0 percent. The flakes were then transported from the Proctor-Schwartz oven to the toasting operation.

The flakes were toasted in a Cretors oven to achieve further drying and toasting. The fan speed of the oven was 1500 revolutions per minute. The flakes were toasted at about 440° F. for about 60 seconds to reduce the moisture content to from about 2.0 percent to about 5.0 percent.

While several advantageous embodiments have been chosen to illustrate the invention, it will be understood by those skilled in the art that various changes and modifications can be made therein without departing from the scope of the invention as defined in the appended claims.

What is claimed is:

1. A method for producing a breakfast cereal comprising the steps of
    extruding a gelatinized starch-containing material to form pellets;
    drying said extruded pellets to a moisture content of from about 9.5 to about 14.0 percent by weight under conditions which inhibit case hardening to form dried half products suitable for extended storage;
    rehydrating said dried pellets to a moisture content of from about 18.0 to about 23.0 percent by weight to form rehydrated half products;
    flaking said rehydrated pellets into flakes; and
    toasting said flakes to a final moisture content of from about 2.0 to about 5.0 percent by weight.

2. The method according to claim 1, including the additional step of
    treating said rehydrated pellets with a moisture-absorbing compound to reduce the stickiness of the outer surface of said pellets prior to said step of flaking said rehydrated pellets.

3. The method according to claim 2, wherein said compound is tricalcium phosphate.

4. The method according to claim 1, including the additional step of
    reducing the moisture content of said flakes to from about 15.0 to about 18.0 percent by weight prior to said step of toasting said flakes.

5. The method according to claim 4, wherein said step of reducing the moisture content of said flakes comprises subjecting said flakes to circulating air.

6. The method according to claim 1, wherein said step of rehydrating said dried pellets comprises subjecting said dried pellets to steam.

7. The method according to claim 6, wherein said step of rehydrating said dried pellets further comprises mechanically manipulating said dried pellets to prevent them from sticking together during rehydration.

8. The method according to claim 7, wherein said dried pellets are steamed and manipulated for about 35 minutes.

9. The method according to claim 1, wherein said step of toasting said flakes comprises subjecting said flakes to a temperature of from about 390° F. to about 500° F. for about 30–60 seconds.

10. The method according to claim 1, wherein said dried pellets are substantially spherically shaped and have a moisture content of from about 13.0 to about 14.0 percent.

* * * * *